US007445420B2

(12) United States Patent
Yoshida

(10) Patent No.: US 7,445,420 B2
(45) Date of Patent: Nov. 4, 2008

(54) HORIZONTAL AXIS WIND TURBINE AND IDLING METHOD OF THE SAME

(75) Inventor: Shigeo Yoshida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 678 days.

(21) Appl. No.: 11/168,394

(22) Filed: Jun. 29, 2005

(65) Prior Publication Data

US 2006/0002793 A1      Jan. 5, 2006

(30) Foreign Application Priority Data

Jun. 30, 2004    (JP)    ............... 2004-193271

(51) Int. Cl.
*F03D 7/04*   (2006.01)

(52) U.S. Cl. ............... 415/4.3; 415/4.5; 415/908; 416/1; 416/40; 416/155

(58) Field of Classification Search ............ 415/4.3, 415/4.5, 908; 416/40, 155, 1; 290/44, 55
See application file for complete search history.

(56) References Cited

U.S. PATENT DOCUMENTS 4,474,531 A * 10/1984 Weiss ............ 416/11
5,289,041 A *  2/1994 Holley ............ 290/44
6,441,507 B1 * 8/2002 Deering et al. ........ 290/44

OTHER PUBLICATIONS

Masaaki Shibata and Yoshiyuki Hayashi "New concept for design load reduction (Sekkei kajuu teigen no tame no shinkonseputo", Wind Energy Utilization Symposium Nov. 20, 2003, p. 225-227.

* cited by examiner

*Primary Examiner*—Ninh H Nguyen
(74) *Attorney, Agent, or Firm*—Birch, Stewart, Kolasch & Birch, LLP

(57) ABSTRACT

A horizontal axis wind turbine includes: a rotor having a hub and at least two or more blades; a nacelle for pivotally supporting the rotor through a rotating shaft connected to the hub; a tower for supporting the nacelle; and an independent pitch control unit capable of independently controlling pitch angles of the blades, respectively, wherein the independent pitch control units control the pitch angles so that all the blades are made in a full feather position in case of a wind speed not less than a predetermined value, and subsequently controls the pitch angles of the respective blades so as to be sequentially reversed one by one, and further subsequently, carries out control so that the wind turbine idles in an all-blade negative feather position where the pitch angles of all the blades are reversed.

5 Claims, 7 Drawing Sheets

HORIZONTAL AXIS WIND TURBINE AND IDLING METHOD OF THE SAME

CROSS-REFERENCE TO RELATED APPLICATIONS

The disclosure of Japanese Patent Application No. 2004-193271 filed on Jun. 30, 2004 including the specification drawing and abstract is incorporated herein by reference in its entirety.

BACKGROUND OF THE INVENTION

1. Field of the Invention

The present invention relates to a horizontal axis wind turbine and an idling method of the same, and in particular, relates to a downwind horizontal axis wind turbine and an idling method of the same in windstorm.

2. Description of Related Art

While hitherto various kinds of wind turbines have been put into practical use for wind power generation, a representative example of general wind turbines that are commercially put into practical use is a horizontal axis wind turbine comprising: a rotor where at least two or more blades formed in such a way that the sectional shape of the blades is like a wing are radially attached to a hub; a nacelle that is connected to the hub and pivotally supports the rotor through a rotating shaft extending in the substantially horizontal direction; and a tower that is installed in the substantially vertical direction and rotatably supports the nacelle. The general horizontal axis wind turbine further comprises: a yaw driving unit capable of whole control of driving yaw motion, which is rotary motion of the nacelle; a yaw brake for braking yaw motion; and a rotating shaft brake for braking rotation of the rotor.

As for a downwind horizontal axis wind turbine, which is one of such horizontal axis wind turbines, a rotor is configured so as to be located on the downwind of a tower and is rotated by the force of the wind caught by blades and the rotary force is transmitted to the rotating shaft to activate a generator connected to the rotating shaft and generate electricity. A horizontal axis wind turbine configured so as to be capable of generating electricity by rotation of a rotor located on the upwind side of a tower is called an upwind type, and is put into practical use as a commercial wind turbine.

Here, production of electricity below rated power is approximately proportional to the square of the rotor radius (blade length) of a horizontal axis wind turbine. For example, while a horizontal axis wind turbine having blades with a length of "20 m" has a "500 kW" rated power, a horizontal axis wind turbine having blades with a length of "40 m" has a "2000 kW" rated power and can respond to heavy electric power demand. Therefore, the size of a horizontal axis wind turbine is being increased at present.

Along with such increase of the size of a wind turbine, a larger load tends to act on a blade root and a top of a tower. While load conditions in design of a wind turbine become strict, it is important to try to improve reliability, trim weight and reduce costs. Reduction of the aerodynamic loads by a rational method is desired.

The design strength of such a wind turbine is greatly affected, for example, by a load caught in circumstances where the wind turbine is exposed to windstorm such as a typhoon.

The horizontal axis wind turbines in which the pitch angle made by the rotor plane and the blade sectional chord can be independently controlled for each blade have been put into practical use. The idling method adopted for the horizontal axis wind turbines is to idle while reducing load of windstorm on the tower and preventing rotor speed from excessively increasing by controlling driving of the direction of the nacelle in the horizontal plane (hereinafter, referred to as yaw control) to arrange the plane of rotation of the rotor to be made vertical to the wind direction and by keeping the full feather position where blades are parallel to the wind direction by motors or hydraulic actuators in case of windstorm.

However, controlling the direction of the rotor or a pitch angle as needed in response to change of the wind direction by yaw control, pitch angle control or the like until windstorm quiets down is not necessarily safe under a situation where electric power to be supplied for respective control systems is shut off, because the cases are expected where electric power supply for the area is shut off owing to blackout in windstorm. Therefore this horizontal axis wind turbine requires design strength in consideration of the worst situation in which both of windstorm and blackout occur.

In general, a downwind horizontal axis wind turbine has a wind turbine characteristic that a rotor is passively arranged on the downwind by yawing moment generated in the rotor by a crosswind or quartering wind without any special controller. Therefore, in an earlier downwind horizontal axis wind turbine, that yaw motion of the nacelle is released without any inhibition or weakening yaw brake, the rotor is always swept downwind and load acting on roots of blades and a tower is relieved when the wind turbine catches a crosswind or a quartering wind.

Also, an earlier upwind horizontal axis wind turbine is configured so that the maximum load on blades and a top of the tower can be reduced by fixing the direction of the rotor by the yaw brake, and further in case of a wind turbine capable of full feather, freely rotating the rotor. In case of a wind turbine incapable of full feather, the wind turbine is configured so as to idle with the rotating shaft fixed by the brake.

Further, an upwind horizontal axis wind turbine has been developed. The upwind is configured so that the rotor is swept downwind and load on the tower can be reduced in windstorm by turning the nacelle over and holding by weak yaw brake after ensuring the full feather. (For example, see Masaaki Shibata and Yoshiyuki Hayashi "New concept for design load reduction (Sekkei kajuu teigen no tame no shinkonseputo", Wind Energy Utilization Symposium Nov. 20, 2003, page 225-227.)

However, there is a problem that a significant effect can not be obtained for reducing loads on blades while load on the top of the tower can be reduced in a horizontal axis wind turbine according to the above earlier development, as compared to the earlier upwind horizontal axis wind turbine, in windstorm.

Also, in the upwind horizontal axis wind turbine shown in the above-described document, load on blades becomes minimum with the plane of rotation of the rotor facing upwind (0/360 deg). In the course of turning the nacelle downwind (180 deg) where the load is second minimum, the maximum load acts around ±30 deg, hence strong design strength is required. Therefore, in view of profitability and costs, the development is not necessarily sufficient.

SUMMARY OF THE INVENTION

A problem of the present invention is to provide a horizontal axis wind turbine capable of reducing design load of blade in windstorm.

In order to resolve the above-described problem, in accordance with the first aspect of the present invention, a horizontal axis wind turbine comprises:

a rotor having a hub and at least two or more blades;
a nacelle for pivotally supporting the rotor through a rotating shaft connected to the hub;
a tower for supporting the nacelle; and
independent pitch control units capable of independently controlling pitch angles of the blades, respectively,
wherein the independent pitch control units control the pitch angles so that all the blades are made in a full feather position in case of a wind speed not less than a predetermined value, and subsequently controls the pitch angles of the respective blades so as to be sequentially reversed one by one, and further subsequently, carries out control so that the wind turbine idles in an all-blade reversing full feather position (hereinafter, referred to as negative feather) where the pitch angles of all the blades are reversed.

According to the first aspect of the invention, in a horizontal axis wind turbine comprising: a rotor having a hub and at least two or more blades; a nacelle for pivotally supporting the rotor through a rotating shaft connected to the hub; a tower for supporting the nacelle; and independent pitch control units capable of independently controlling pitch angles of the blades respectively, all blades are controlled by the independent pitch control units so as to be brought into the full feather position in windstorm such as a typhoon. As a result of this, the drag acting on the blades owing to the wind is reduced and further the load acting on the tower is reduced.

Afterward, the respective blades are controlled by the independent pitch control units so as to be sequentially reversed one by one. In case that all blades are reversed at once, there is an area where a great rotation torque is generated in the course of reversing. Whereas, by reversing the blades one by one, it is possible to shift the condition having all blades reversed while suppressing the loads acting on the blades and the tower.

Subsequently, the wind turbine idles in the all-blade reversing full feather position where the trailing edges are directed upwind, and thereby the lift owing to the wind is significantly reduced as compared to the case where the leading edge is directed upwind. Consequently, an attitude which enables the wind turbine to idle with the lowest load is prepared as an idling position in windstorm.

According to this invention, in a horizontal axis wind turbine comprising: a rotor having a hub and at least two or more blades; a nacelle for pivotally supporting the rotor through a rotating shaft connected to the hub; a tower for supporting the nacelle; and independent pitch control units capable of independently controlling pitch angles of the blades respectively, firstly, the pitch angles of all blades are brought into the full feather position where the blades are parallel to the wind direction, for example, in windstorm such as a typhoon. Thereby, the aerodynamic loads on the respective blades can be reduced. As a result of this, the load acting on the tower and the blades can be reduced.

Further, the pitch angles of the respective blades are sequentially reversed by the independent pitch control units one by one, hence it is possible to minimize increase of load acting on the blades and tower as compared to the case that all blades are reversed at once. As a result of this, it is possible to prevent generation of excessive load on the blade and to effectively prevent overspeed of the rotor.

Further, it is possible to reverse the blades while always keeping the plane of rotation of the rotor substantially perpendicular to the wind direction without yaw motion. Therefore, in performing yaw motion in windstorm, it is possible to avoid increase of load that is generated in case of the rotor plane located at an angle not perpendicular to the wind direction. In order to reduce wind load much more, the blades can be reversed in such a way that the side of the trailing edge is directed upwind. Thus, increase of load acting on the blades and tower owing to a quartering wind or a crosswind can be prevented.

Subsequently, the wind turbine idles in the free yaw condition where yaw slips without any inhibition with the trailing edge of the blades directed upwind, and thereby the nacelle is rotated in such a way that the rotor is always located downwind even if the wind direction changes. Therefore the load acting on the blade and tower can be reduced while being relieved. Accordingly, the rotor can be always located on the downwind side of the tower and the load caught owing to the wind can be minimized without a special controller for attitude maintenance of a wind turbine for example, even in windstorm such as a typhoon. Furthermore, the design strength of a wind turbine can be reduced, and costs can be reduced.

The tower may support the nacelle on an upwind side of the rotor.

According to this invention, in the wind turbine wherein the tower supports the nacelle on an upwind side of the rotor, all blades are controlled by the independent pitch control units so as to be brought into the full feather position in windstorm such as a typhoon. As a result of this, the load acting on the blades owing to the wind is reduced and further the load acting on the tower is reduced.

Afterward, the respective blades are controlled by the independent pitch control units so as to be sequentially reversed one by one. As a result of this, the load acting on the blades and tower is greatly reduced as compared to the case that all blades are reversed at once.

Subsequently, the wind turbine idles in the all-blade reversing full feather position where the trailing edges are directed upwind, and thereby the aerodynamic lift is significantly reduced as compared to the case where the leading edge is directed upwind. Consequently, an attitude which enables the wind turbine to idle with the lowest load is prepared as an idling position in windstorm.

According to this invention, the similar effect with the first aspect of the invention can be obtained. In addition, particularly, the yawing moment that is a wind turbine characteristic generated by a quartering wind or cross wind can be effectively utilized for control of idling position in windstorm because the tower is configured so as to support the nacelle upwind of the rotor. As a result of this, the wind turbine can idle in the wind turbine attitude that minimizes the load acting on the blades and the tower in windstorm.

In accordance with the second aspect of the present invention, a idling method of a horizontal axis wind turbine comprises:

holding pitch angles of all blades in a full feather position where the blades are parallel to a direction of a wind in case of a wind speed not less than a predetermined value;
sequentially reversing the pitch angles of the respective blades one by one after the holding; and
holding the pitch angles of all the blades in an all-blade reversing full feather position where the pitch angles are reversed after the reversing.

According to the second aspect of the invention, the rotor is effectively prevented from achieving overspeed and also the load acting on the top of the tower is greatly reduced by controlling a horizontal axis wind turbine so as to perform: holding pitch angles of all blades in a full feather position where the blades are parallel to a, direction of a wind in case of a wind speed not less than a predetermined value; sequentially reversing the pitch angles of the respective blades one by one after the holding; and holding the pitch angles of all the blades in an all-blade reversing full feather position where the pitch angles are reversed after the reversing, in this order.

According to the second aspect of the invention, it is possible to greatly reduce the rotation force acting on the rotor compared with, for example, the case that all blades are reversed from the full feather position at once in windstorm such as a typhoon, because of performing in the above-described order: holding pitch angles of all blades in a full feather position where the blades are parallel to a direction of a wind in case of a wind speed not less than a predetermined value; sequentially reversing the pitch angles of the respective blades one by one after the holding; and holding the pitch angles of all the blades in an all-blade reversing full feather position where the pitch angles are reversed after the reversing. Accordingly, the rotor is effectively prevented from achieving overspeed in this process and also the load acting on the top of the tower is greatly reduced. Thus the design load of a horizontal axis wind turbine can be greatly reduced.

In accordance with the third aspect of the invention, a horizontal axis wind turbine comprises: at least two or more blades; and an independent pitch control unit capable of independently controlling pitch angles of the blades, respectively, wherein the independent pitch control unit controls the pitch angles so that all the blades are made in a full feather position in case of a wind speed not less than a predetermined value, and subsequently controls the pitch angles of the respective blades so as to be sequentially reversed one by one, and further subsequently, carries out control so that the wind turbine idles in an all-wing reversing full feather position where the pitch angles of all the blades are reversed.

The wind turbine may be a downwind type.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

DETAILED DESCRIPTION OF THE PREFERED EMBODIMENTS

Hereinbelow, an embodiment of the present invention will be described in detail with reference to drawings.

Figure 1:
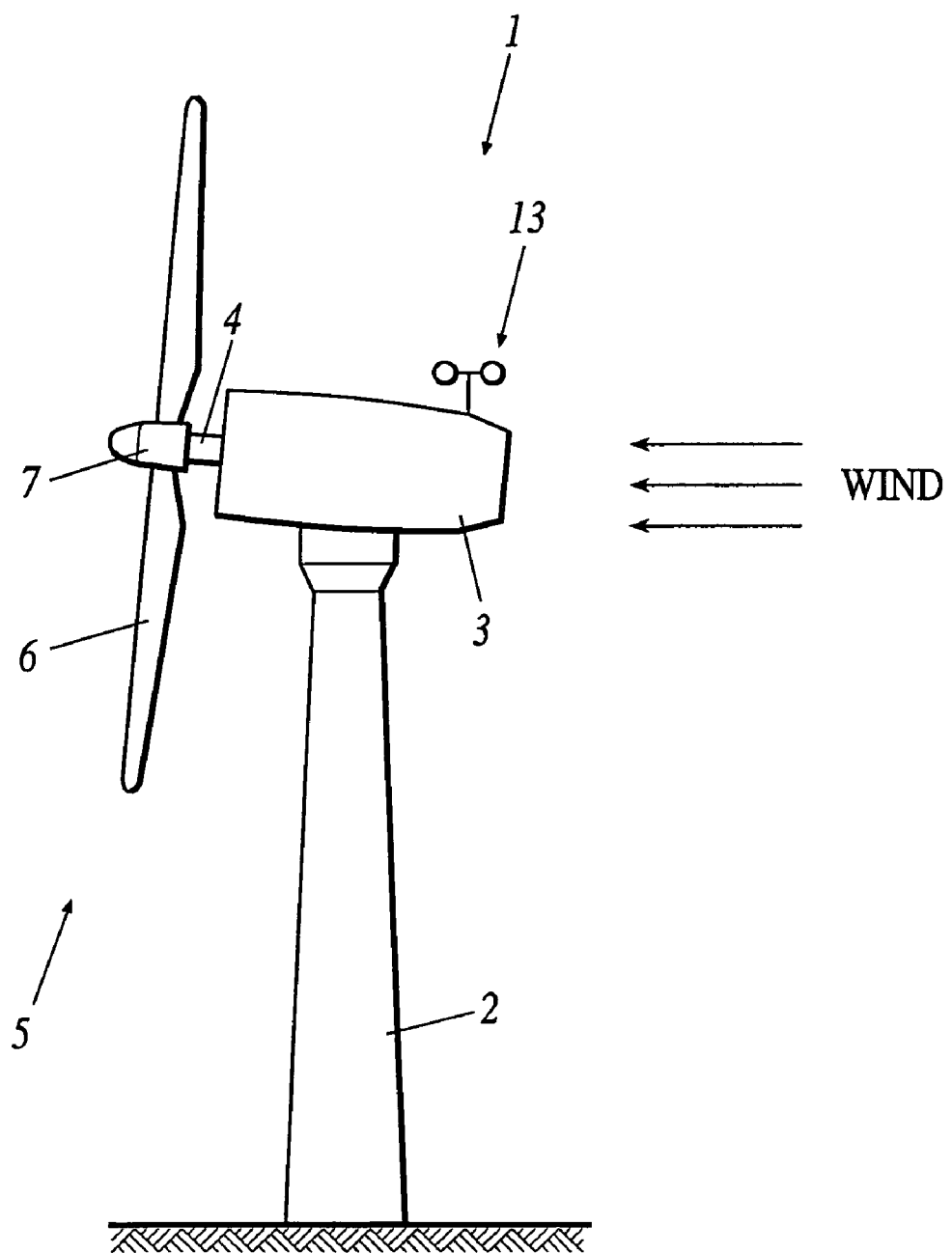
FIG. 1 is a schematic view showing the whole configuration of a horizontal axis wind turbine according to the present embodiment.

First, the configuration of a horizontal axis wind turbine 1 according to the present embodiment is described by use of FIG. 1.

As shown FIG. 1, the horizontal axis wind turbine 1 according to the present embodiment is a so-called downwind horizontal axis wind turbine and comprises a tower 2 that is approximately cylindrical and installed at a predetermined location. A nacelle 3 is supported at the top of the tower 2 in such a way that the nacelle 3 is rotatable in the horizontal plane.

An anemometer 13 is provided outside the nacelle 3. The connection of the nacelle 3 and the tower 2 is provided with: a yaw driving device 14 capable of detecting and driving yaw motion, which is rotary motion of the nacelle 3 in the horizontal plane, and comprising a not shown yaw brake for braking the yaw motion; and a yaw control device 15 for controlling the yaw driving device 14 (see FIG. 2).

Power trains including a not shown gear box, generator, rotating shaft brake and the like are contained inside the nacelle 3. A rotating shaft 4 extending in the approximately horizontal direction is connected to the respective power transmission devices in such a way that the rotating shaft 4 is rotatable and capable of being braked by the rotating shaft brake.

An end of the rotating shaft 4 projects outside the nacelle 3. A rotor 5 is attached to the end of the rotating shaft 4 so as to rotate along with the rotating shaft 4. The nacelle 3 rotates when the rotor 5 catches a quartering wind or crosswind, and thereby the rotor 5 is always located downwind of the tower 2 with respect to the wind direction.

The rotor 5 has a hub 7 in the central portion of the rotor 5 and the hub 7 is connected with the rotating shaft 4. Three blades 6 are radially attached on the peripheral surface of the rotation direction of the hub 7. The blades 6 mounted in the horizontal axis wind turbine 1 are very-long blade having a length of "about 40 m". The diameter of the plane of rotation of the rotor having the blades 6 is "80 m". The sectional shape of the blades 6 is formed to be a airfoil section. In normal operations, the leading edges of the wings are arranged so as to be directed upwind.

The horizontal axis wind turbine 1 further comprises in the present embodiment independent pitch control units 12 capable of controlling pitch angles made by the plane of rotation of the rotor 5 and a blade sectional chord for each blade 6 independently. Each blade 6 can be independently controlled by each controller within the range of at least 180°.

Here, the configuration of the controller C in the present embodiment comprising the independent pitch control unit 12 is described in detail.

Figure 2:
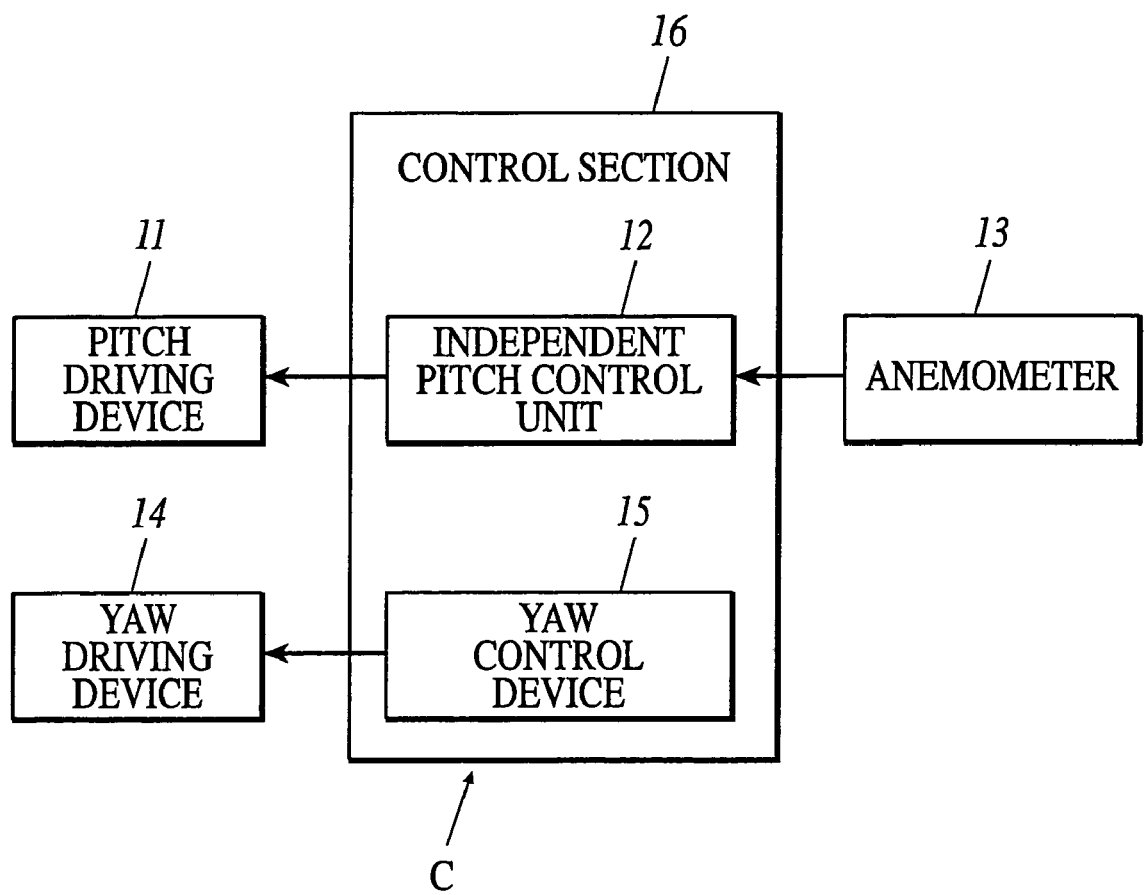
FIG. 2 is a control block diagram of an independent pitch control unit in the present embodiment.

FIG. 2 is a control block diagram of an independent pitch control unit mounted to the horizontal axis wind turbine 1 in the present embodiment. As shown in FIG. 2, a control section 16 which is the controller C is provided for the horizontal axis wind turbine 1 in the present embodiment. The control section 16 comprises the above-described independent pitch control units 12 and yaw control device 15.

When the wind speed measured by the anemometer 13 exceeds a cut-out wind speed that is the upper limit of the operational wind speed range, the independent pitch control unit 12 can control all the blades 6 to be brought into the all-blade full feather position where all the blades are parallel to the wind direction by controlling a pitch driving device 11 that is provided so as to perform rotation drive independently for each blade 6.

The independent pitch control unit 12 can control all the blades 6 to be brought into the all-blade reversing full feather position where the trailing edges of the blades 6 are directed upwind by sequentially reversing the pitch angles of the respective blades 6 one by one after the above-described all-blade full feather position is ensured.

The independent pitch control units 12 are configured so as to hold the pitch angles of all the blades 6 in the above-described reversing full feather position while the wind speed measured by the anemometer 13 is not less than the cut-out wind speed.

The yaw control device 15 waits in the condition where a weak yaw brake is made to act on the yaw motion of the nacelle 3 by controlling the yaw driving device 14 after all the blades 6 are in the reversing full feather position by the independent pitch control units.

Figure 3:
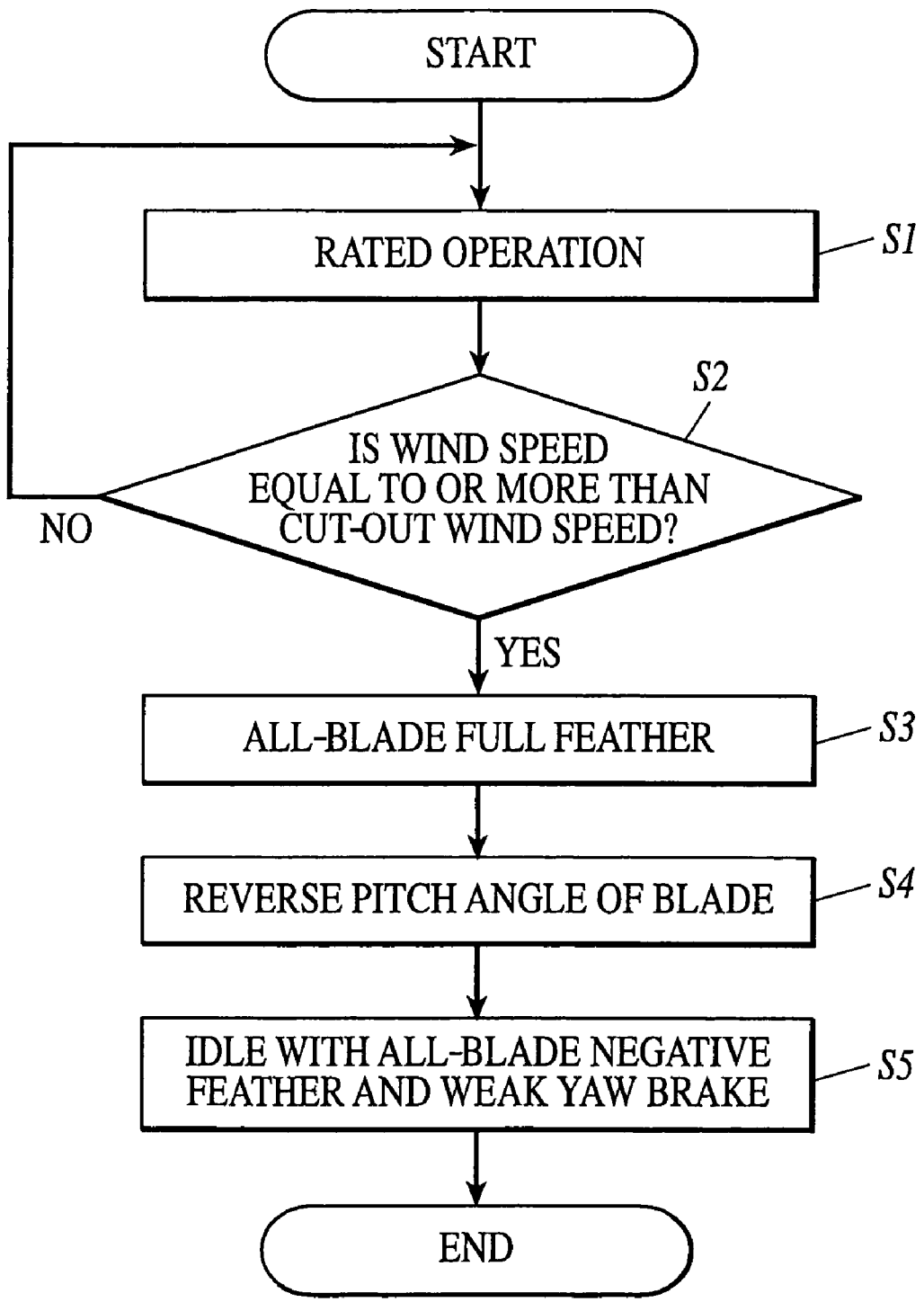
FIG. 3 is a flow chart showing an operation procedure in the present embodiment.

Next, the horizontal axis wind turbine and its idling method according to the present embodiment is described with reference to a flow chart shown in FIG. 3 regarding a idling method by the above-described independent pitch control unit 12 in windstorm.

First, as shown in FIG. 1, the downwind horizontal axis wind turbine 1 according to the present embodiment catches the wind and rotates in the condition where the rotor 5 is always located downwind of the tower 2 owing to the yawing moment that is a wind turbine characteristic caused by catching a quartering wind or a crosswind.

The rotational torque of the rotor 5 is transmitted to the rotating shaft 4 connected to the hub 7 through the hub 7 provided at the center of the rotor 5, and transmitted to the not shown generator connected to the rotating shaft 4 and contained inside the nacelle 3. Thereby, kinetic energy of rotation motion is converted into electric energy.

Here, commonly as for commercial wind generation, a wind range suitable for generation exists in consideration of mechanical strength, generation efficiency and safety aspect. In the wind speed range beyond the upper limit of the wind range (cut-out wind speed), the horizontal axis wind turbine does not perform generation and is controlled so as to idle in the attitude capable of reducing wind load as much as possible in order to avoid windstorm.

As for the horizontal axis wind turbine 1 in the present embodiment, after the rated operation condition (Step S1), the above-described independent pitch control unit 12 drives the pitch driving device 11 to bring all the blades 6 into the full feather position parallel to the wind direction (Step S3) to reduce wind load acting on the blades and tower 2 when the anemometer 13 detects the wind speed beyond the cut-out wind speed (Step S2: Yes), for example, in windstorm.

In this time, the independent pitch control units 12 control the blades 6 to hold the angle parallel to the wind direction in the condition where the leading edges are directed upwind.

The rotor 5 is automatically located downwind of the tower 2 by the yawing moment that is the above-described wind turbine characteristic, and thereby the plane of rotation of the rotor 5 is stably located at the position perpendicular to the wind-direction.

Next, the three blades 6 are sequentially reversed by the above-described independent pitch control units 12 one by one and controlled to be brought into the reversing full feather position where the trailing edges are directed upwind (Step S4).

After all the blades 6 are controlled to be brought into the all-blades negative feather position where all the blades 6 are reversed, the horizontal axis wind turbine 1 idles until the termination of windstorm in the condition where the yaw control device 15 controls the yaw driving device 14 to put a weak yaw brake (Step S5).

Figure 6:
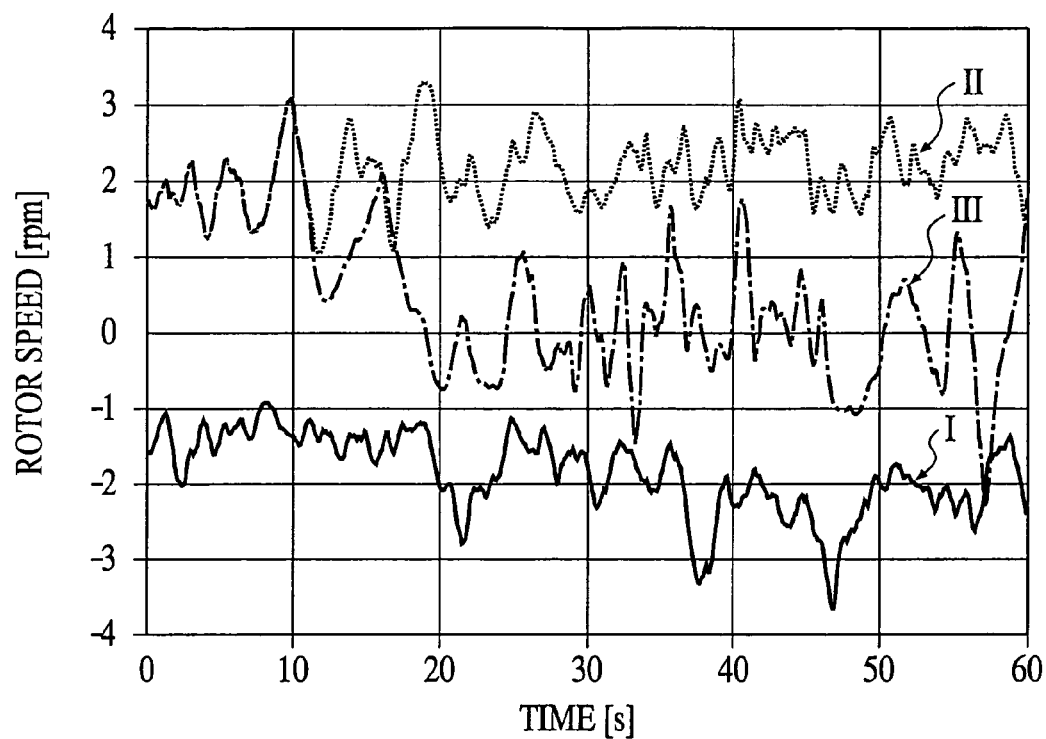
FIG. 6 is a time history of a rotor speed in the analysis of the idling method of the horizontal axis wind turbine according to the present embodiment.

Here, as shown in FIG. 6, the rotor 5 has the rotor speed of 2 to 3 rpm and almost stops in both of the full feather position where the leading edges are directed upwind and the reversing full feather position where the trailing edges are directed upwind. However, there is something undesirable in the course of reversing having an angle intermediate between these positions because a large torque is generated, for example, the rotor 5 experiences small load and achieves overspeed in the course of reversing in case of reversing the three blades 6 at once.

Therefore the horizontal axis wind turbine 1 according to the present embodiment effectively prevents the rotor 5 from overspeed by sequentially reversing the three blades 6 one by one by the independent pitch control units 12 as described above. In this case, while one blade 6 is reversed, the rotor rotates about ⅓ to ½ times as fast as that in the rated operation, but there is no large effect on the strength. The load acting particularly on the top of the tower 2 is significantly reduced, for example, as compared to the case of reversing the three blades at once.

Subsequently, the horizontal axis wind turbine 1 idles until termination of windstorm while relieving the wind load so that the rotor 5 is always located downwind according to change of the wind direction by setting the yaw brake torque at 400 kNm in the reversing full feather position where all the blades 6 are reversed (Step S5).

Most of the aerodynamic loads acting on the blades 6 during the idling in the condition of Step S5 is owing to lift. The maximum lift is significantly reduced in case of idling in the condition where the trailing edges are directed upwind as the present embodiment, as compared to the case of idling in the condition where the leading edges are directed upwind as the earlier development. Therefore, bending load acting on the blades 6 is significantly reduced. As a result of this, bending load acting on the hub 7 is significantly reduced and further the tower-center lateral force acting on the tower 2 can be also suppressed at a sufficiently low level.

As described above, according to the horizontal axis wind turbine 1, firstly, the pitch angles of all blades 6 are brought into the full feather position where the blades 6 are parallel to the wind direction, for example, in windstorm such as a typhoon. Thereby, the drag acting on the respective blades 6 owing to the wind can be reduced. As a result of this, the load acting on the blades 6 and tower 2 can be reduced.

Further, the pitch angles of the respective blades 6 are sequentially reversed by the independent pitch control unit 12 one by one, hence it is possible to minimize increase of load acting on the blades 6 and tower 2 as compared to the case that all blades are reversed at once. As a result of this, it is possible to prevent generation of excessive drag and lift on the blades 6 and to effectively prevent overspeed of the rotor 5.

Further, it is possible to reverse the blades 6 while always keeping the plane of rotation of the rotor 5 substantially perpendicular to the wind direction without yaw motion. Therefore, in performing yaw motion in windstorm, it is possible to avoid increase of load that is generated in case of the plane of rotation of the rotor 5 located at an angle not parallel to the wind direction. In order to reduce wind load much more, the blades 6 are reversed in such a way that the side of the trailing edge is directed upwind. Thus, increase of load acting on the blades and tower owing to a quartering wind or a crosswind can be prevented.

Subsequently, the horizontal axis wind turbine 1 idles in the free yaw position where rotation of the nacelle 3 is released without any inhibition with the trailing edge of the blades 6 directed upwind, and thereby the nacelle 3 is rotated in such a way that the rotor 5 is always located downwind even if the wind direction changes. Therefore the load acting on the blades 6 and tower 2 can be reduced while being relieved. Accordingly, the rotor 5 can be always located on the downwind side of the tower 2 and the load caught owing to the wind can be minimized without a special controller for attitude maintenance of the horizontal axis wind turbine 1, for example, even in windstorm such as a typhoon. Furthermore, the design strength of the horizontal axis wind turbine 1 can be relaxed, design freedom can be improved, and costs can be reduced.

Additionally, in this case, the yawing moment that is a wind turbine characteristic generated by a quartering wind or cross wind can be effectively utilized for control of idling position in windstorm by configuring the tower so as to support the nacelle upwind of the rotor. As a result of this, the wind turbine can idle in the wind turbine attitude that minimizes the load acting on the blades and tower in windstorm.

Furthermore, according to the idling method of the horizontal axis wind turbine 1 in the present embodiment, the idling method is performed in the following steps, step of holding pitch angles of all blades 6 in a full feather position where the blades 6 are parallel to a direction of a wind in case of a wind speed not less than a predetermined value, step of sequentially reversing the pitch angles of the respective blades 6 one by one after the holding, step of holding the pitch angles of all the blades 6 in an all-blade negative feather position where the pitch angles are reversed after the reversing. Therefore, it is possible to greatly reduce the torque acting on the rotor 5 compare with, for example, the case that all blades 6 are reversed from the full feather position at once in windstorm such as a typhoon. Accordingly, it is possible to effectively prevent the rotor 5 from achieving overspeed in this process and also to greatly reduce the load acting on the top of the tower 2. Thus the design load of the horizontal axis wind turbine 1 can be greatly reduced, and design freedom can be improved.

EXAMPLE

Next, examples embodying the present invention are described in detail with reference to the drawings. The present example shows the result of comparing the simulation result of the case (case No. (I)) of the following conditions: (1) the rotor position is a downwind type; (2) the yaw brake torque is 400 kNm; (3) the diameter of the rotor is 80 m; (4) the number of blade is three; (5) independent pitch control can be performed for each blade; and (6) the full feather pitch angle is 86 deg., and the wind direction/speed model of a fluctuating wind having an average wind speed of 50 m/sec shown in FIG. 3, with the case (case No. (II)) of an ordinary downwind type and having a pitch angle of −86 deg. (negative feather position) that is the same as the horizontal axis wind turbine comprising the independent pitch control unit and the case (case No. (III)) of a horizontal axis wind turbine that is an ordinary upwind type and comprises the independent pitch control unit. The summary of results of analysis regarding idling methods of the above-described horizontal axis wind turbines is shown in Table 1. As for items of wing root bending percentages and rotor bending percentages, percentages in comparison with the maximum value recorded for each item are shown in Table 1.

TABLE 1

| Case No. | Case name | Pitch angle | Yaw brake | Wing root bending % | Rotor bending % |
|---|---|---|---|---|---|
| (I) | i5090nn4 | −86 deg | Sliding | 67 | 74 |
| (II) | i5090nff | 86 deg | Sliding | 96 | 86 |
| (III) | i5090nrf | 86 deg | Fixation | 100 | 100 |

Figure 4:
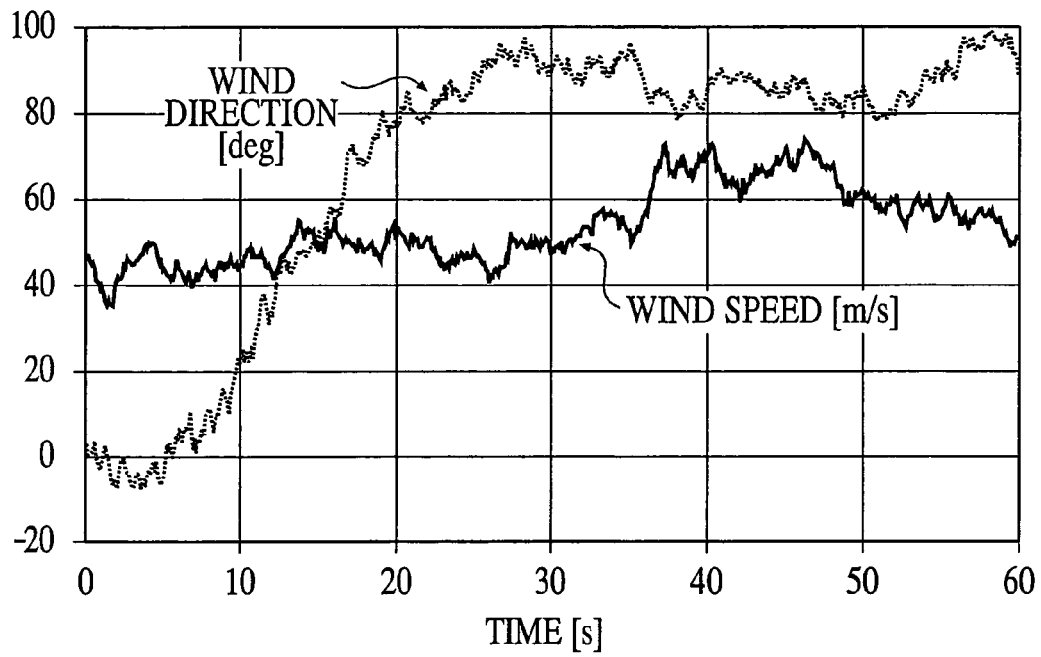
FIG. 4 is a wind-direction/wind-speed model applied to analysis of a idling method of the horizontal axis wind turbine according to the present embodiment.

As shown in FIG. 4, the wind direction/speed model used for the present embodiment is a fluctuating wind having an average wind speed 50 m/sec, and the measure time is 60 seconds.

Figure 5:
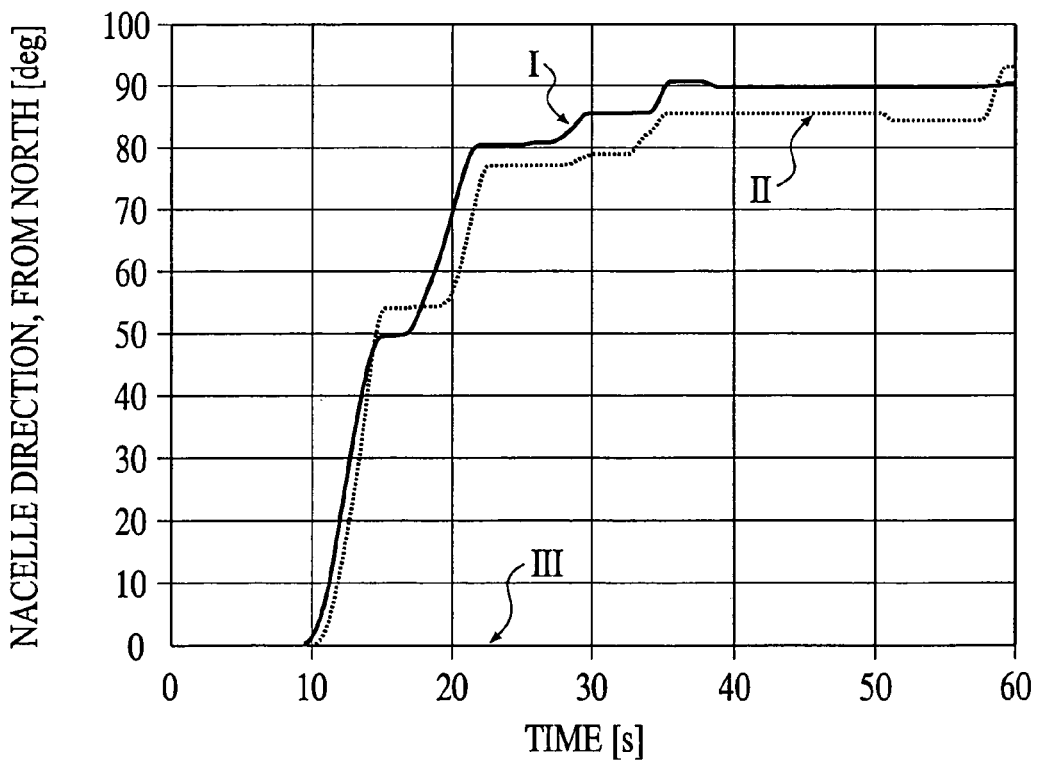
FIG. 5 is a history of an azimuth angle in the analysis of the idling method of the horizontal axis wind turbine according to the present embodiment.

In the results of analysis using the wind direction/speed model, the direction of the nacelle does not change in the case (case No. (III)) of an upwind type and idling with the fixed yaw as shown in FIG. 5. In the other cases, yaw slips and the azimuth angle of the nacelle 3 changes so that the plane of rotation of the rotor 5 is made perpendicular to the wind direction according to change of the wind direction (see FIG. 4).

The rotor 5 has a rotor speed of −3 to 3 rpm and hardly rotates in the upwind type/fixed yaw/full feather position (case No. (III)) shown in FIG. 6. The rotor speed of the rotor 5 is 1 to 3 rpm in the downwind type/free yaw/full feather position (case No. (II)). The rotor speed is −4 to −1 rpm in the downwind type/free yaw/full feather position (case No. (I)). The rotor 5 rotates in the direction opposite the case of (II) because the pitch angle is reversed compared with the case of (II). The rotor speed hardly increases, because every case is in the full feather-position or negative feather position where pitch angles are controlled so that the lifts generated in blades 6 become the minimum.

Figure 7:
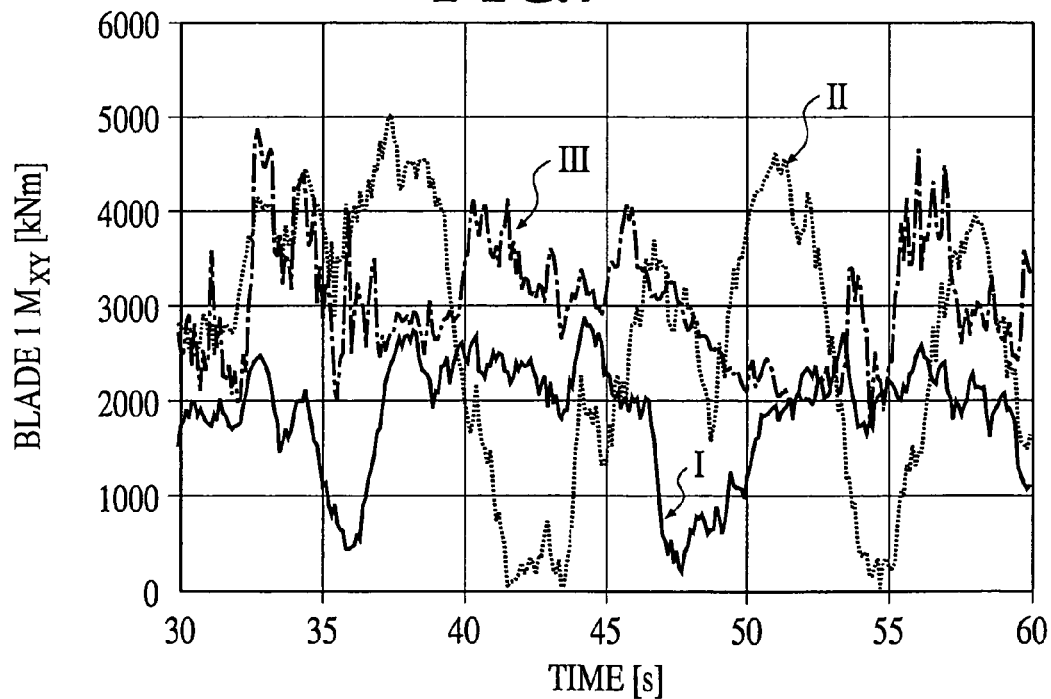
FIG. 7 is a graph showing a time history of a blade-root load (blade 6-#1) in the analysis of the idling method of the horizontal axis wind turbine according to the present embodiment.
Figure 8:
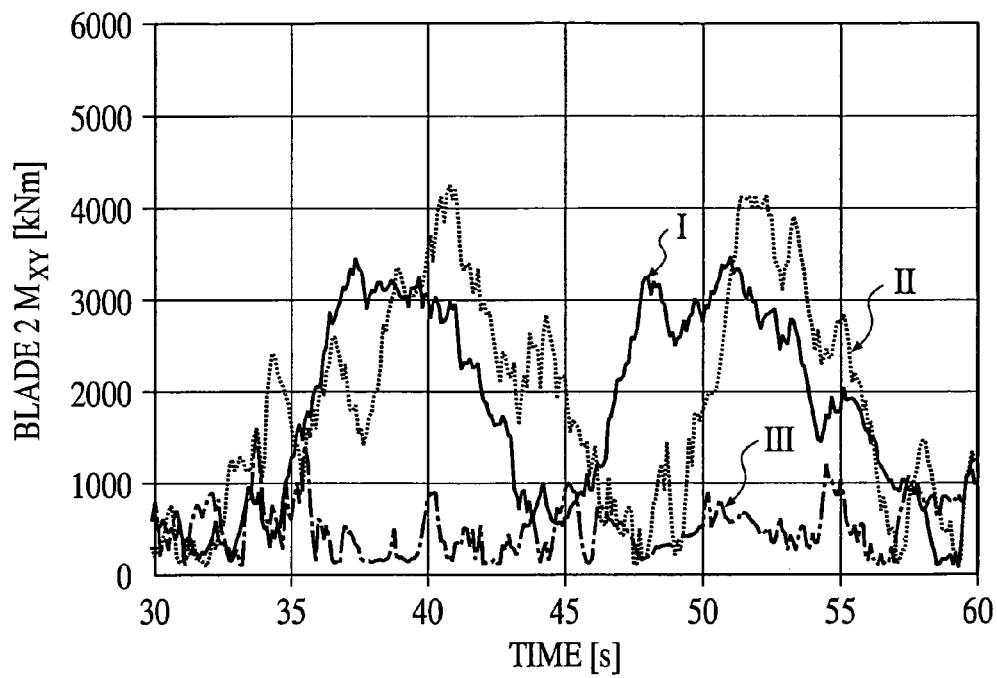
FIG. 8 is a graph showing a time history of a blade-root load (blade 6-#2) in the analysis of the idling method of the horizontal axis wind turbine according to the present embodiment.
Figure 9:
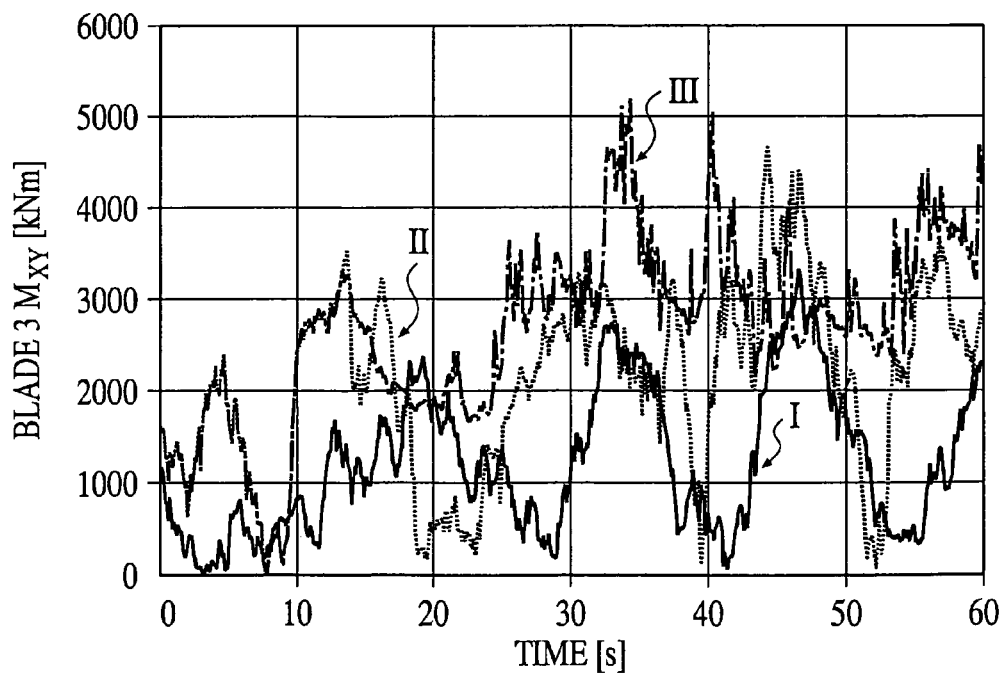
FIG. 9 is a graph showing a time history of a blade-root load (blade 6-#3) in the analysis of the idling method of the horizontal axis wind turbine according to the present embodiment.

Next, the blade root bending load is described in detail by using FIGS. 7 to 9. The horizontal axis wind turbine 1 according to the present embodiment comprises three blades 6. The respective blades 6 is defined as blades 6-#1 to 3 and bending moments acting on the respective blades 6 are shown in FIGS. 7 to 9.

Here, which blade 6 the largest bending load acts on in design depends on conditions. For example, the wind speeds at the position as high as the hub 7 is shown as the wind speeds. However, a wind speed is not constant and not uniform at the respective points in the plane of rotation of the rotor 5. Therefore, bending loads acting on the respective blades 6 owing to the wind depend on situations of the wind at the time. Particularly in case of a downwind horizontal axis wind turbine, difference is also caused in the loads acting on the respective blades 6 depending on an azimuth angle made by a blade 6 and the central axis of the tower because of an effect of a tower shadow.

As shown in FIGS. 7 to 9, as for the blades 6 mounted on the horizontal axis wind turbine 1 according to the present embodiment, the maximum values of respective bending loads are recorded to the blade 6-#2 in case of the upwind type/fixed yaw/full feather position, to the blade 6-#1 in case of the downwind type/free yaw/full feather position, and to the blade 6-#3 in case of the downwind type/free yaw/negative feather position. As understood from FIGS. 7 to 9, the bending loads acting on the respective blades 6 in case the downwind type/free yaw/negative feather position, which is case No. (I), are generally low, and it is found that possession of an effect of reducing loads clearly appears.

Figure 10:
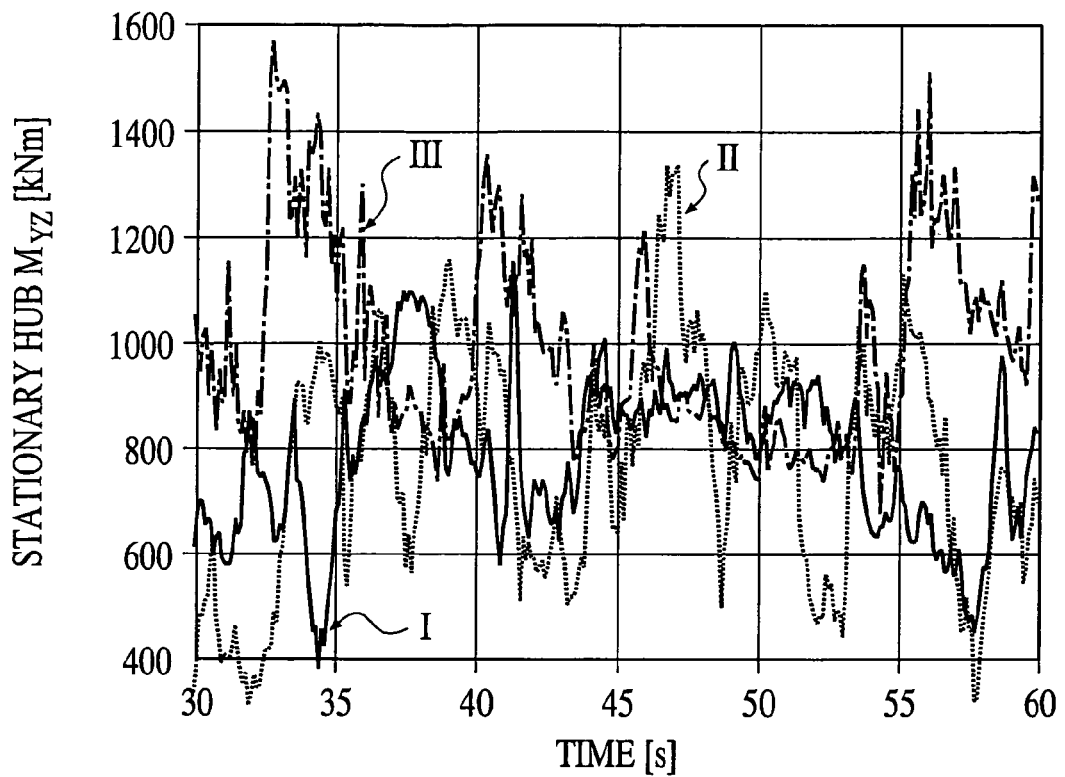
FIG. 10 is a graph showing a time history of a bending moment of a hub in the analysis of the idling method of the horizontal axis wind turbine according to the present embodiment.
Figure 11:
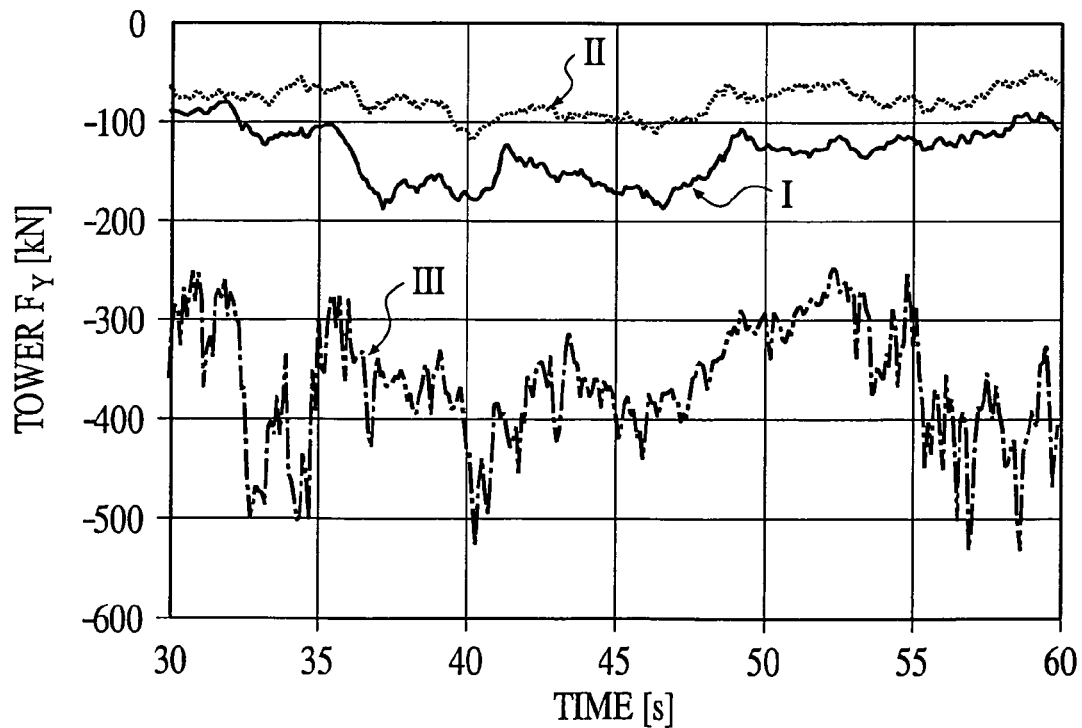
FIG. 11 is a graph showing a time history of a tower-center lateral force in the analysis of the idling method of the horizontal axis wind turbine according to the present embodiment.

As shown in FIG. 10, the hub bending load acting on the hub 7 to which the blades 6 are attached is reduced when the horizontal axis wind turbine 1 idles in the downwind/free yaw/negative feather position.

Moreover, it is found that the center lateral force in the horizontal direction acting on the tower 2 in the case of idling in the downwind/free yaw/negative feather position is somewhat inferior to that in the case of idling in the downwind/free yaw/full feather position, while being significantly reduced as compared to that in the case of idling in the upwind/fixed yaw/full feather position, as shown in FIG. 10.

As above, according to the horizontal axis wind turbine and the idling method of the same relating to the present embodiment, idling in the free yaw and negative feather position (the condition of (I)) makes it possible to suppress the loads acting on the blades 6 and the tower 2 in windstorm to be the lowest.

What is claimed is:

1. A horizontal axis wind turbine comprising:
    a rotor having a hub and at least two or more blades;
    a nacelle for pivotally supporting the rotor through a rotating shaft connected to the hub;
    a tower for supporting the nacelle; and
    an independent pitch control unit capable of independently controlling pitch angles of the blades, respectively,
    wherein the independent pitch control units control the pitch angles so that all the blades are made in a full feather position in case of a wind speed not less than a predetermined value, and subsequently controls the pitch angles of the respective blades so as to be sequentially reversed one by one, and further subsequently, carries out control so that the wind turbine idles in an all-blade negative feather position where the pitch angles of all the blades are reversed.

2. The wind turbine as claimed in claim 1, wherein the tower supports the nacelle on an upwind side of the rotor.

3. An idling method of a horizontal axis wind turbine, comprising:
    holding pitch angles of all blades in a full feather position where the blades are parallel to a direction of a wind in case of a wind speed not less than a predetermined value;
    sequentially reversing the pitch angles of the respective blades one by one after the holding; and
    holding the pitch angles of all the blades in an all-blade negative feather position where the pitch angles are reversed after the reversing.

4. A horizontal axis wind turbine comprising:
    at least two or more blades; and
    an independent pitch control unit capable of independently controlling pitch angles of the blades, respectively,
    wherein the independent pitch control units control the pitch angles so that all the blades are made in a full feather position in case of a wind speed not less than a predetermined value, and subsequently control the pitch angles of the respective blades so as to be sequentially reversed one by one, and further subsequently, carries out control so that the wind turbine idles in an all-blade negative feather position where the pitch angles of all the blades are reversed.

5. The wind turbine as claimed in claim 4, wherein the wind turbine is a downwind type.

* * * * *